INVENTORS
Charles E. Bates
William G. Herridge
BY
C. R. Meland
THEIR ATTORNEY

INVENTORS
Charles E. Bates
William G. Herridge
BY
C. R. Meland
THEIR ATTORNEY

May 24, 1966 C. E. BATES ETAL 3,253,167
DYNAMOELECTRIC MACHINE

Filed Aug. 3, 1961 4 Sheets-Sheet 4

INVENTORS
Charles E. Bates
William G. Herridge
BY
C. R. Meland
THEIR ATTORNEY

United States Patent Office 3,253,167
Patented May 24, 1966

3,253,167
DYNAMOELECTRIC MACHINE
Charles E. Bates and William G. Herridge, Anderson, Ind., assignors to General Motors Corporation, Detroit, Mich., a corporation of Delaware
Filed Aug. 3, 1961, Ser. No. 128,998
12 Claims. (Cl. 310—68)

This invention relates to dynamoelectric machines wherein an alternating current is generated in the output winding of the machine and is rectified to direct current by a plurality of built-in diodes.

One of the objects of this invention is to provide a dynamoelectric machine that has built-in diodes that are supported in metal heat sink members, the machine having air inlet openings located in alignment with the heat sink members but out of alignment with the diodes whereby the heat sinks are cooled by cooling air which is prevented from substantial direct contact with the diodes.

Another object of this invention is to provide a dynamoelectric machine having an A.C. output winding and a pair of heat sink members that each carry a plurality of diodes that form a three-phase full wave bridge rectifier network, the heat sinks being mounted such that air flows substantially along three sides of the heat sinks to provide maximum cooling of the heat sinks and diodes.

Still another object of this invention is to provide an alternating current generator that comprises a fixed stator and a rotatable rotor that includes a field winding and a pair of members having interleaved fingers, there being a noise suppressor ring tightly engaging the inner surfaces of the interleaved fingers which is comprised of an annular sheet metal piece having alternate slots and projecting dimples that engage the interleaved fingers.

Another object of this invention is to provide an alternating current generator that has diodes supported by heat sinks, the heat sinks being in turn supported by a tubular housing that also supports the generator stator.

Further objects and advantages of the present invention will be apparent from the following description, reference being had to the accompanying drawings wherein preferred embodiments of the present invention are clearly shown.

Figure 3:
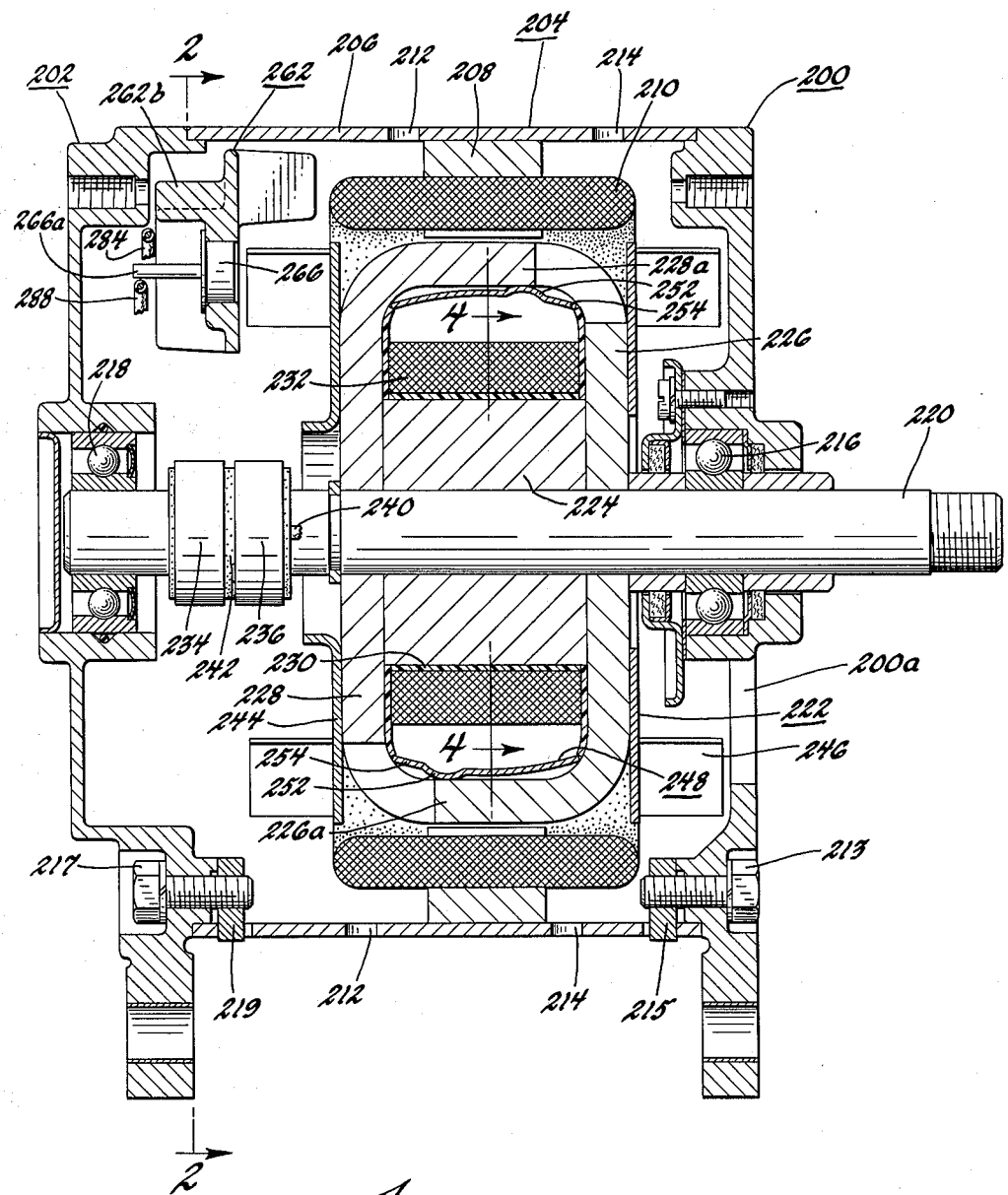
FIGURE 3 is a sectional view taken along line 3—3 of FIGURE 1.

Referring now to FIGURE 3, it is seen that the dynamoelectric machine has a pair of end frames 200 and 202 which are preferably formed of die cast aluminum material. The end frames 200 and 202 are secured to a stator assembly which is generally designated by reference numeral 204. The stator assembly includes a tubular member 206 formed of a magnetic material such as steel which supports the steel stator laminations 208. The stator laminations 208 may be welded or otherwise secured to the annular housing member 206 and support a three-phase Y-connected stator winding designated by reference numeral 210. It is pointed out that the steel housing member 206 has a series of circumferentially spaced air outlet openings designated by reference numerals 212 and 214. As can be seen from FIGURE 3, these air outlet openings are positioned on opposite sides of the stator laminations 208. The outlet openings 212 and 214 extend around the outer periphery of the steel housing 206 to provide sufficient air exit capacity for the dynamoelectric machine.

The end frame 200 is secured to the stator assembly 204 by bolts 213 that are threaded into the mounting lugs 215. The mounting lugs 215 fit within openings formed in the steel housing 206. It can be seen that end frame 202 is secured to stator assembly 204 in the same manner by means of bolts 217 and mounting lugs 219.

The end frames 200 and 202 are fitted respectively with bearings 216 and 218 which support the shaft 220 that forms a part of a rotor assembly generally designated by reference numeral 222. The shaft 220 carries a core member 224 which is press fitted to the shaft and which is formed of a magnetic material. In addition, the shaft 220 carries pole members 226 and 228 which are press fitted to the shaft 220 and which are formed of a magnetic material. The shaft 220 may be splined over the area contacted by the pole members 226 and 228 and over the area contacted by the core member 224 in order that these members will have a nonrotatable press fit with the shaft 220. The pole member 226 has a plurality of circumferentially spaced fingers 226a which interleave with the circumferentially spaced fingers 228a of the pole member 228.

Figure 2:
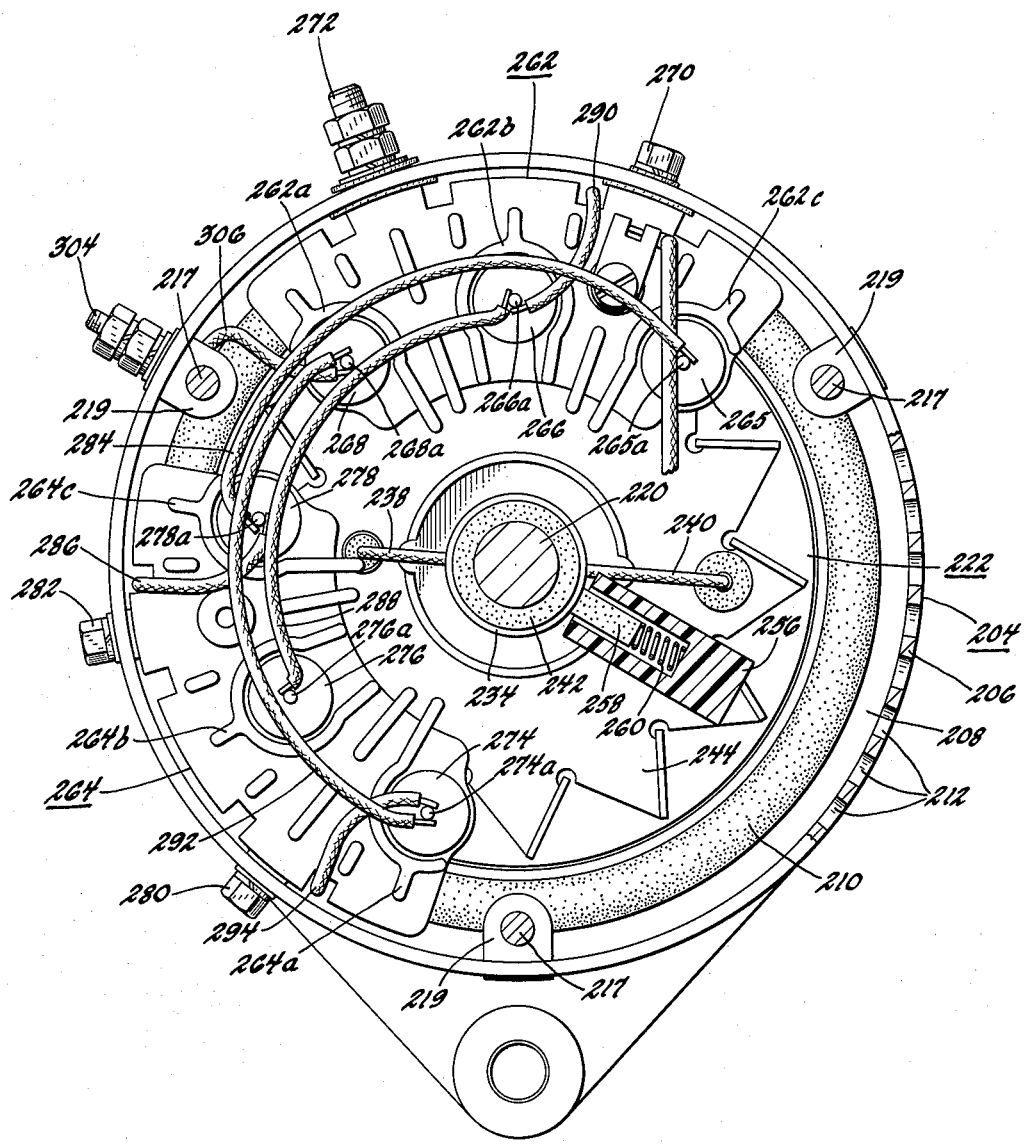
FIGURE 2 is a view similar to FIGURE 1 with parts broken away illustrating the heat sink construction of a dynamoelectric machine made in accordance with this invention.

The core member 224 supports a spool 230 formed of a suitable electrical insulating material and a field winding 232 is wound on this spool. Field winding 232 is connected with slip rings 234 and 236 by lead wires 238 and 240 which are illustrated in FIG. 2. The slip rings 234 and 236 are supported on an annular insulating member 242 which has a press fit on the shaft 220.

The pole member 228 supports a fan 244 which may be welded or otherwise secured to the pole member 228. In a similar fashion, the pole member 226 carries a fan 246 which is likewise welded or otherwise secured to this pole member. It thus is seen that as the rotor assembly 222 rotates, the fans 244 and 246 will likewise be rotated to exhaust air out through the air exit openings 212 and 214. The conductors 238 and 240 which connect the field winding 232 with the slip rings 234 and 236 pass through openings in the fan 244 and are suitably insulated from this fan.

Figure 4:
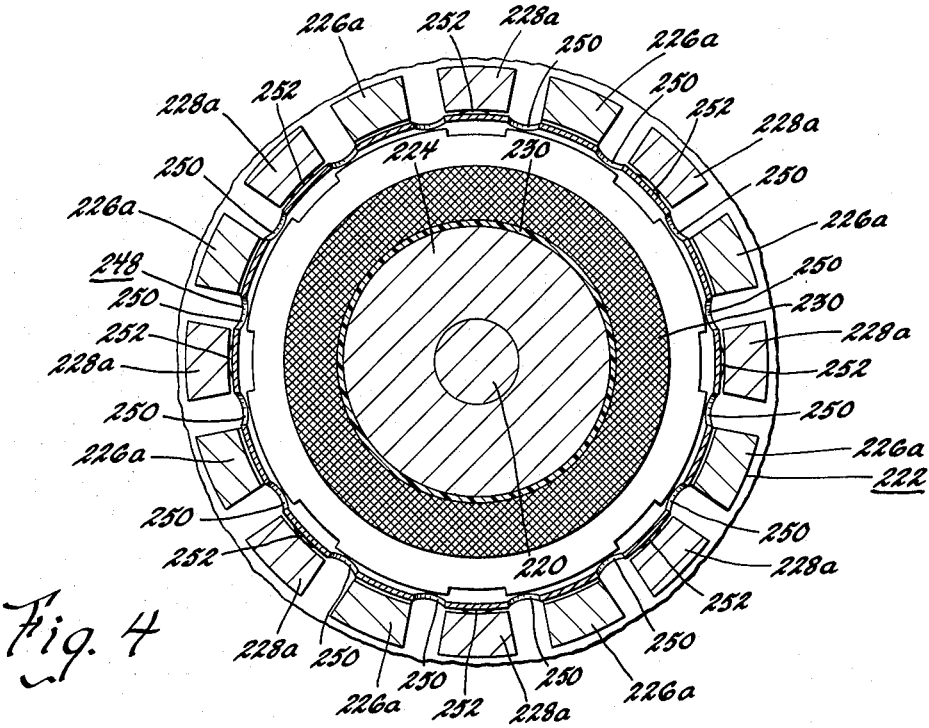
FIGURE 4 is a sectional view taken along line 4—4 of FIGURE 3.
Figure 5:
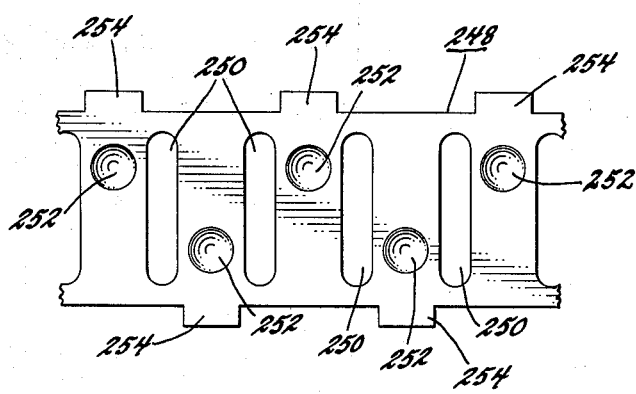
FIGURE 5 is a plan view of a portion of a noise suppressor which is ilustrated in FIGURES 3 and 4.

The rotor assembly of FIGURE 3 includes a noise suppressor which is generally designated by reference numeral 248. The noise suppressor is formed of a nonmagnetic material such as wall extruded aluminum tubing. From FIGURE 5, it can be seen that the noise suppressor 248 has a plurality of circumferentially spaced slots 250 and circumferentially spaced dimples 252. In addition, the noise suppressor has side extensions designated by reference numeral 254. It can be seen from FIGURES 3 and 4, that the noise suppressor, when in its assembled condition in the pole members 226 and 228 has an annular configuration with the dimples engaging the alternate teeth of the pole members 228 and 226. The dimples are so arranged that they engage the inner surface of the fingers 228a and 226a very near the end of these fingers. It is also seen that the extensions 254 engage the edges of the spool member 230 and with this arrangement, the noise suppressor 252 exerts a pressure or force on the fingers 228a and 226a and this has been found to reduce the noise generated by the dynamoelectric machine during its use.

It will be appreciated that when the shaft 220 is rotated, for example, from the engine of a motor vehicle, the rotor assembly rotates with respect to the stator assembly 208. If the field winding 232 is now supplied with direct current via the slip rings and via siutable brushes supported within a brush holder 256, there will be an A.C. voltage generated in the stator winding 210. The brush holder 256 is supported by and positioned between bosses 257 and 259 of the end frame 202 and contains a pair of brushes which engage the slip rings 234 and 236. The brush holder 256 is formed of a suitable electrical insulating material and the brush that engages slip ring 234 is designated by reference numeral 258 and is urged into engagement with the slip ring 234 by the spring 260. It will be apparent that the brush holder 256 will contain another brush which engages the slip ring 236 and that these brushes are capable of supplying direct current to the field winding 232 when they are connected with a suitable supply of direct current.

The alternating current which is generated in the three-phase Y-connected stator winding 210 is rectified to direct current by built-in rectifiers. To this end, and referring now more particularly to FIGURE 2, the steel housing 206 supports a pair of heat sink members which are designated respectively by reference numerals 262 and 264.

The heat sinks 262 and 264 are both formed of die cast aluminum material and the heat sink 262 is formed with openings which receive the diodes 265, 266 and 268. The diodes are of the pn junction semiconductor type and preferably are of the silicon type having an outer metal case which forms one terminal side of the diode and relatively stiff projecting terminal leads 265a, 266a and 268a which respectively form the other terminal side of a diode. In other words, the rectifying junctions of the respective diodes are electrically connected with the case of the diode and with the projecting terminals.

It can be seen from FIGURES 2 and 3 that the openings for the diodes are encircled by air directing ribs 262a, 262b and 262c. These ribs effectively prevent air from flowing directly in contact with the top end of the diodes over the area where the terminal leads 265a, 266a and 268a emerge from the diode. These ribs thus will prevent salt spray and the like from directly contacting the terminal leads of the diodes and this is important since these terminal leads must be insulated from the diode case and materials such as salt spray and the like can be detrimental to the life of the diodes. It can be seen that the heat sink 262 is also provided with other radially extending ribs and all of these ribs including those encircling the diodes and the diode openings tend to direct the air downwardly as will become more readily apparent hereinafter.

The heat sink 262 is supported by the steel housing member 206 by a bolt 270 having a complementary nut, and a terminal stud 272. The fastener 270 and the terminal stud 272 pass through slots formed in the rear side of the heat sink 262 and suitable insulating material is provided to insulate the heat sink 262 from the metal housing 206. This insulating material also insulates the fastener 270 and the terminal stud 272 from the metal frame 206. The heat sink 262 with its mounted rectifiers is thus electrically insulated from the metal frame 206 but is electrically connected with the terminal stud 272 so that the terminal stud 272 will be at the same electrical potential as the case side of the rectifiers 265, 266 and 268 and will of course be at the same electrical potential as the heat sink 262.

The heat sink 264 is identical in configuration to the heat sink 262 and has openings receiving the diodes 274, 276 and 278. The diodes 274, 276 and 278 are identical with diodes 265, 266 and 268 with the exception that the cases have a different polarity and the rectifying junction is actually reversed from the rectifying junction of diodes 265 through 268. With this arrangement, the heat sink member 264 will be at an opposite electrical polarity to that of the heat sink member 262 since the rectifying junctions in the diodes 274 through 278 are in the reverse direction. It is seen that the heat sink member 264 is provided with air guiding ribs 264a, 264b and 264c which are identical with the ribs of the heat sink 262. These ribs are for the same purpose as the ribs on the heat sink 262 and it is seen that the heat sink 264 also has straight radially extending ribs, the purpose of which will be more fully described hereinafter.

The heat sink 264 is secured to the metal frame 206 by the bolts 280 and 282 having complementary nuts, and which fit within slots formed in the rear side of the heat sink 264. The fasteners 280 and 282 need not be electrically insulated from either the metal housing 206 or the heat sink 264 since they serve to electrically connect the heat sink 264 with the metal housnig 206. From the foregoing, it is apparent that the metal frame of the dynamoelectric machine will be at the same electrical potential as the heat sink 264 and at the same electrical potential as the case side of the rectifiers 274, 276 and 278.

It can be seen from FIGURE 2 that the terminal 265a of rectifier 265 is connected with the terminal 278a of diode 278 by lead wire 284 and that both of these terminals are connected with one of the phase windings of the stator winding 210 by a lead wire 286. In a similar fashion, the terminal 266a of diode 266 is connected with the terminal of 276a of diode 276 by a lead wire 288 and these terminals are connected with another phase winding of the stator winding 210 by the lead wire 290. The terminal 268a of diode 268 is connected with the terminal 274a of diode 274 by the lead wire 292 and these terminals are connected with another phase winding of stator winding 210 by the lead wire 294. It thus is seen that the rectifiers are connected in a three-phase full wave bridge rectifier network with the heat sinks forming a common connection between one side of each group of rectifiers and with the output from the bridge rectifier network appearing between terminal stud 272 and the frame of the generator.

Figure 1:
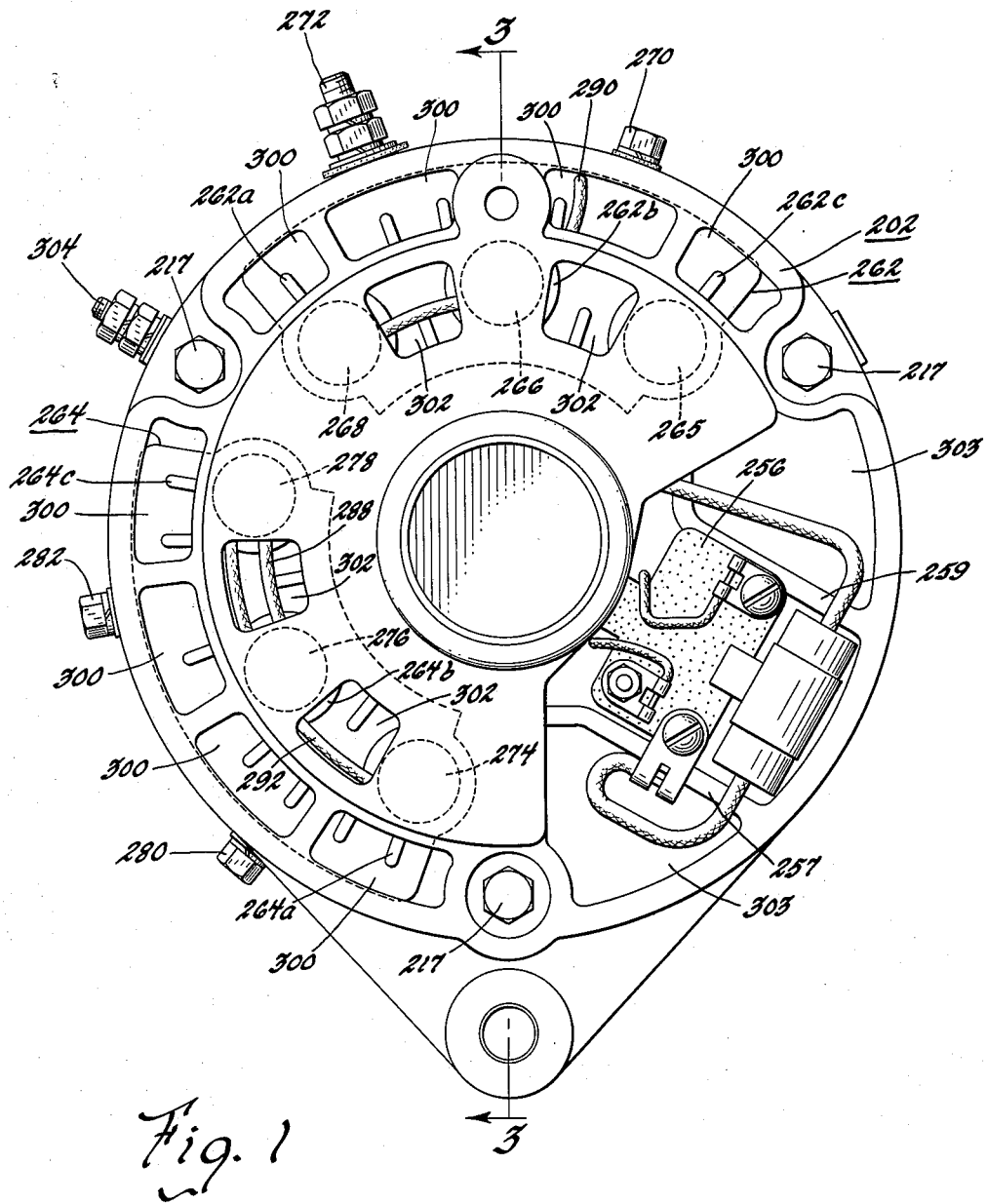
FIGURE 1 is an end view of a dynamoelectric machine made in accordance with this invention.

Referring now more particularly to FIGURE 1, it is seen that the end frame 202 is provided with a first set of circumferentially spaced air inlet openings 300 and another set of circumferentially spaced air inlet openings 302 which are positioned inwardly from the air inlet openings 300. It can be seen from FIGURE 1 that the air inlet openings 300 are positioned over areas which are located at the outer extremity of the heat sinks 262 and 264. In other words, any air entering the air inlet openings 300 will contact areas of the heat sinks 262 and 264 which are outside the ribs encircling the diodes and the diode openings. The openings 302 are positioned such that air entering these openings will contact areas of the heat sinks 262 and 264 that are between adjacent ribs, for example, between ribs 262a and 262b of the heat sink 262. It therefore is seen that any air entering the openings in end frame 202 cannot directly contact the diodes fitted in the heat sinks but rather contacts areas outside of the air directing ribs which are formed in the heat sinks.

Referring now to FIGURE 2, it is seen that a terminal stud 304 is provided and this terminal stud is connected with a lead wire 306. The terminal stud 304 is electrically insulated from the frame 206 and passes through an opening formed in this frame. The lead wire 306 connects the terminal stud 304 with the terminal 268a of rectifier 268. The terminal 304 is thus connected to the junction point of the terminal side of rectifiers 268 and 274 and this terminal 304 can be connected to one side of a relay to energize the relay from the terminal and one of the D.C. output terminals of the machine.

The path for the cooling air flowing through the dynamoelectric machine illustrated in FIGURES 1 through 5 will now be described. Cooling air is drawn into the dynamoelectric machine through the openings 300 and 302 formed in the end frame 202 and also through a plurality of openings 200a formed in the end frame 200. The fan 244 draws cooling air through the end frame 202 and causes it to exit through the openings 212 whereas the fan 246 draws air into the openings 200a and causes it to exit through the openings 214 formed in the tubular housing 206. The air being drawn through the machine by the fan 246 will come in contact with one end of the stator winding 210 to transfer heat away from it. The cooling air drawn into the openings 300 and 302 in the end frame 202 serves to cool the heat sinks 262 and 264 and also serves to cool the stator winding 210. Air also may enter through the large opening 303 formed in the end frame 202. The air entering the openings 300 and 302 will contact the heat sinks 262 and 264 and then will be directed radially inwardly by the ribs formed on the heat sinks. The air contacting the heat sinks after being directed radially inwardly will pass along the inner edges of the heat sinks 262 and 264 and then will be directed past the rear sides of the heat sinks and then out through the exit openings 212 where it passes in contact with the stator winding 210. The cooling air for heat sinks 262 and 264 thus effectively contacts three sides of the heat sinks, namely, the front side with the projecting ribs, the inner circumferentially extending edges of the heat sinks and the back sides of the heat sinks as the air is flowing towards the exit air openings. This provides for very efficient cooling of the heat sinks and also provides for efficient cooling of the diodes which transfer heat to the heat sinks during operation of the dynamoelectric machine. It can be seen that with the arrangement as just described, the air entering the end frame 202 is directed against the heat sinks but not directly against the ends of the diodes and the heat sinks are therefore effectively cooled without directing air directly against the diodes. By directing the air against the heat sinks but not against the diodes, salt spray and the like is kept away from the diodes where it might cause damage or failure of the same.

While the embodiments of the present invention as herein disclosed constitute a preferred form, it is to be understood that other forms might be adopted.

What is claimed is as follows:

1. A dynamoelectric machine comprising, first and second end frames, a tubular housing member supported between said end frames, said tubular housing member supporting a stator including stator laminations and a three-phase output winding, a rotor member including flux generating means rotatably supported by said end frames, first and second heat sink blocks supported by said tubular housing member, said first heat sink block being electrically connected with said tubular housing member and said second heat sink block being electrically insulated therefrom, a first group of semiconductor diodes supported by said first heat sink block, a second group of semiconductor diodes supported by said second heat sink block, said groups of semiconductor diodes being of opposite conductivity types, electrical connections connecting pairs of said diodes together and with a respective phase winding of said output winding, a plurality of air inlet openings in one of said end frames located in alignment with outer areas of said heat sink members, air exit openings formed in said tubular housing member, and air impelling means driven by said rotor member positioned between said heat sink members and said air exit openings for drawing air into the air inlet openings and impelling it out through said exit openings, said air when being impelled between said inlet and exit openings flowing around said heat sink members.

2. A dynamoelectric machine comprising, first and second end frames, a stator assembly located between said end frames including a tubular metal housing, stator laminations supported by said housing, a three-phase stator winding wound on said stator laminations, a rotor rotatably supported by said end frames including flux generating means, first and second heat sink members supported by said tubular housing, said first heat sink member being electrically connected with said tubular housing and said second heat sink member being electrically insulated therefrom, a first group of semiconductor diodes of one conductivity type mounted in said first heat sink member, a second group of semiconductor diodes of an opposite conductivity type mounted in said second heat sink member, means electrically connecting pairs of said diodes together and with a respective phase winding of said stator winding, a plurality of air inlet openings formed in one of said end frames and located out of alignment with the diodes in said heat sink members, a plurality of air outlet openings formed in said tubular housing member, and air impelling means rotatable with said rotor for pulling air into said inlet openings and exhausting it out through said outlet openings, said air in passing between said inlet and outlet openings contacting at least three sides of said heat sink members.

3. A dynamoelectric machine comprising, first and second end frames, a tubular housing member supported by said end frames having a longitudinal axis which is substantially normal to the planes of said end frames, a stator including stator laminations and a three-phase output winding supported by said tubular housing member, first and second heat sink members supported by said tubular housing member, said first heat sink member being electrically insulated from said housing member and said second heat sink member being electrically connected with said housing member, a first group of semiconductor diodes supported by said first heat sink member having one conductivity type, a second group of semiconductor diodes of an opposite conductivity type mounted in said second heat sink member, means electrically connecting pairs of said diodes together and with the phase windings of said stator winding, air inlet openings formed in one of said end frames located in alignment with one side of said heat sink members but out of alignment with said diodes, air exit openings formed in said tubular housing member located on an opposite side of said heat sink members from said air inlet openings, and air impelling means for causing a flow of air between said air inlet openings and said air outlet openings.

4. In combination, an alternating current generator having a pair of end frames, a tubular housing member supported between said end frames, a stator assembly including a three-phase stator winding supported by said tubular housing member, first and second arcuately extending metal heat sink members supported by said tubular housing member, said heat sink members being positioned between one of said end frames and said stator assembly, a first group of semiconductor diodes mounted in said first heat sink member, a second group of semiconductor diodes mounted in said second heat sink member, means electrically connecting the respective phase windings of said stator winding with said diodes, air inlet openings in one of said end frames, air outlet openings in said tubular housing located adjacent said stator assembly and on a side of said heat sink members opposite from said air inlet openings, and air impelling means for causing a circulation of air between said inlet and outlet openings.

5. A dynamoelectric machine comprising, first and second end frames, a tubular perforate housing member supported between said end frames, said tubular housing member supporting a stator including stator laminations and a three-phase output winding, a rotor member including flux generating means rotatably supported by said end frames, first and second metal heat sink blocks secured to said tubular housing member adjacent said first end frame, said first heat sink block being electrically connected with said tubular housing member and said second heat sink block being electrically insulated therefrom, a first group of semiconductor diodes supported by said first heat sink block, a second group of semiconductor diodes supported by said second heat sink block, said groups of semiconductor diodes being of opposite conductivity type, electrical connections connecting pairs of said diodes together and with a respective phase winding of said output winding, a plurality of air inlet openings formed in said first end frame located in alignment with said heat sink blocks and out of alignment with said diodes, said perforate tubular member having air outlet openings, and air impelling means driven by said rotor member positioned between said heat sink blocks and said air outlet openings for drawing air into the air inlet openings and impelling it out through said outlet openings, said air when being impelled between said inlet and exit openings flowing around said heat sink blocks.

6. A dynamoelectric machine comprising, first and second end frames, a tubular housing disposed between said end frames, a rotor member journaled for rotation in said end frames including a flux generating means, a stator supported by said tubular housing including stator laminations carrying a three-phase output winding, first and second metal heat sink members located between said first end frame and said output winding and secured to said tubular housing, said heat sink members carrying respectively diodes of opposite conductivity type which are electrically connected with said output winding, air impelling means secured to said rotor and positioned between said heat sink members and said rotor and adjacent one end of said stator winding, air inlet openings formed in said first end frame located in alignment with said heat sink member, and air outlet openings formed in said tubular housing member, said air outlet openings being located at one side of said metal heat sink members opposite from the side facing said first end frame.

7. A dynamoelectric machine comprising, first and second end frames, a tubular housing disposed between said end frames, a stator assembly supported by said tubular housing including stator laminations carrying a three-phase output winding, a rotor member journaled for rotation in said end frame having a flux generating means located within said stator assembly, first and second metal heat sink members located within and adjacent to said said first end frame, said metal heat sink members each carrying diodes of opposite conductivity type, means electrically connecting said diodes with said three-phase output winding, a first air inlet opening formed in said first end frame, a second air inlet opening formed in said second end frame, first and second air outlet openings formed in said tubular housing disposed on opposite sides of said stator laminations, a first air impelling means carried by said rotor for impelling air between said first air inlet opening and said first air outlet opening, and second air impelling means carried by said rotor for impelling air between said second air inlet opening and said second air outlet opening.

8. The dynamoelectric machine according to claim 7 wherein the metal heat sink members are secured to the tubular housing member and where one of the heat sink members is electrically connected to the housing member and the other heat sink member is electrically insulated from the housing member.

9. The dynamoelectric machine according to claim 7 where the air inlet opening formed in said first end frame is in alignment with at least a portion of one of said heat sink members but out of alignment with the diodes.

10. A dynamoelectric machine comprising, a housing formed of a tubular part secured to said first and second end frames, a stator assembly including stator laminations carrying a three-phase output winding supported by the inner wall of said tubular part, first and second metal heat sinks located within said housing adjacent said first end frame, a rotor member rotatably supported by said end frames including a flux generating means rotatable within said stator assembly, said first and second metal heat sinks each carrying a group of diodes which are of opposite conductivity types and which are electrically connected with said output winding, at least one air inlet opening located in said first end frame located in alignment with one side of one of said metal heat sink members, at least one air outlet opening formed in said tubular part located on an opposite side of said metal heat sink member, and an air impelling means driven by said rotor and disposed on the side of said metal heat sink opposite from the side facing said first end frame, said air impelling means impelling air between said air inlet opening and said air outlet opening and around said metal heat sink.

11. The dynamoelectric machine according to claim 10 where the metal heat sinks are secured to the tubular part.

12. The dynamoelectric machine according to claim 10 where the air inlet opening is out of alignment with the diodes.

References Cited by the Examiner
UNITED STATES PATENTS

| | | | |
|---|---|---|---|
| 2,608,677 | 8/1952 | Wightman et al. | 310—59 |
| 2,648,788 | 8/1953 | Fleischer | 310—51 |
| 2,720,600 | 10/1955 | Pollard | 310—51 |
| 2,934,662 | 4/1960 | Robinson | 310—68.4 |
| 3,001,121 | 9/1961 | Kerr | 310—68.4 |
| 3,003,073 | 10/1961 | Bixler et al. | 310—59 |
| 3,041,484 | 6/1963 | Freer et al. | 310—68.4 |

ORIS L. RADER, *Primary Examiner.*

MILTON, O. HIRSHFIELD, *Examiner.*

A. J. ROSSI, *Assistant Examiner.*